United States Patent [19]

Theer et al.

[11] Patent Number: 4,777,514
[45] Date of Patent: Oct. 11, 1988

[54] LASER COMPUTER OUTPUT MICROFILM CAMERA

[75] Inventors: Anton Theer; Michael Demant; Heinz Webersik, all of Munich, Fed. Rep. of Germany

[73] Assignee: AGFA-Gevaert AG, Fed. Rep. of Germany

[21] Appl. No.: 44,981

[22] Filed: Apr. 30, 1987

[30] Foreign Application Priority Data

May 10, 1986 [DE] Fed. Rep. of Germany ....... 3615780

[51] Int. Cl.$^4$ .............................................. G03B 27/44
[52] U.S. Cl. ......................................... 355/54; 355/64
[58] Field of Search .................... 355/40, 45, 53, 54, 355/50, 64, 66

[56] References Cited

U.S. PATENT DOCUMENTS

| 4,035,074 | 7/1977 | Flor | 355/53 X |
| 4,427,292 | 1/1984 | Buchanan | 355/54 |
| 4,572,891 | 2/1986 | Drexler | 430/12 X |

OTHER PUBLICATIONS

Article from *Journal of Applied Photographic Engineering:* "Fuji Film Laser COM System", by A. Miyauchi, et al., (vol. 9, No. 1, Feb. 1983).

*Primary Examiner*—Michael L. Gellner
*Assistant Examiner*—D. Rutledge
*Attorney, Agent, or Firm*—Michael J. Striker

[57] ABSTRACT

A laser computer output microfilm camera for utilization of direct read after write film comprises a film gate, device for transporting a film in the film gate in stepped manner in one direction, device for moving the film gate normal to the one direction and parallel to a film plane also in a stepped manner, film supply device for supplying a film into the film gate, device for receiving a ready to use microfiche produced from the film, device for deviating a laser beam in the region of an image field of a microfiche image from the beginning of lines to the end of lines and back, and to a next line and back, objective device for projecting the laser beam onto the film gate or onto a film contained in the latter, the film supply device being formed as at least partially open stable container in which the film as a microfiche sheet film is stored in a stack, withdrawing device for withdrawing the film from the stable container and then transporting to the device for transporting the film, the stable container being immovable, and control device arranged to control the movement of the film gate, the transportation of sheet film in the film gate, the return of the film gate after production of the a microfiche to a loading position associated with the stable container, the control device being formed as a single control device.

18 Claims, 1 Drawing Sheet

U.S. Patent
Oct. 11, 1988
4,777,514
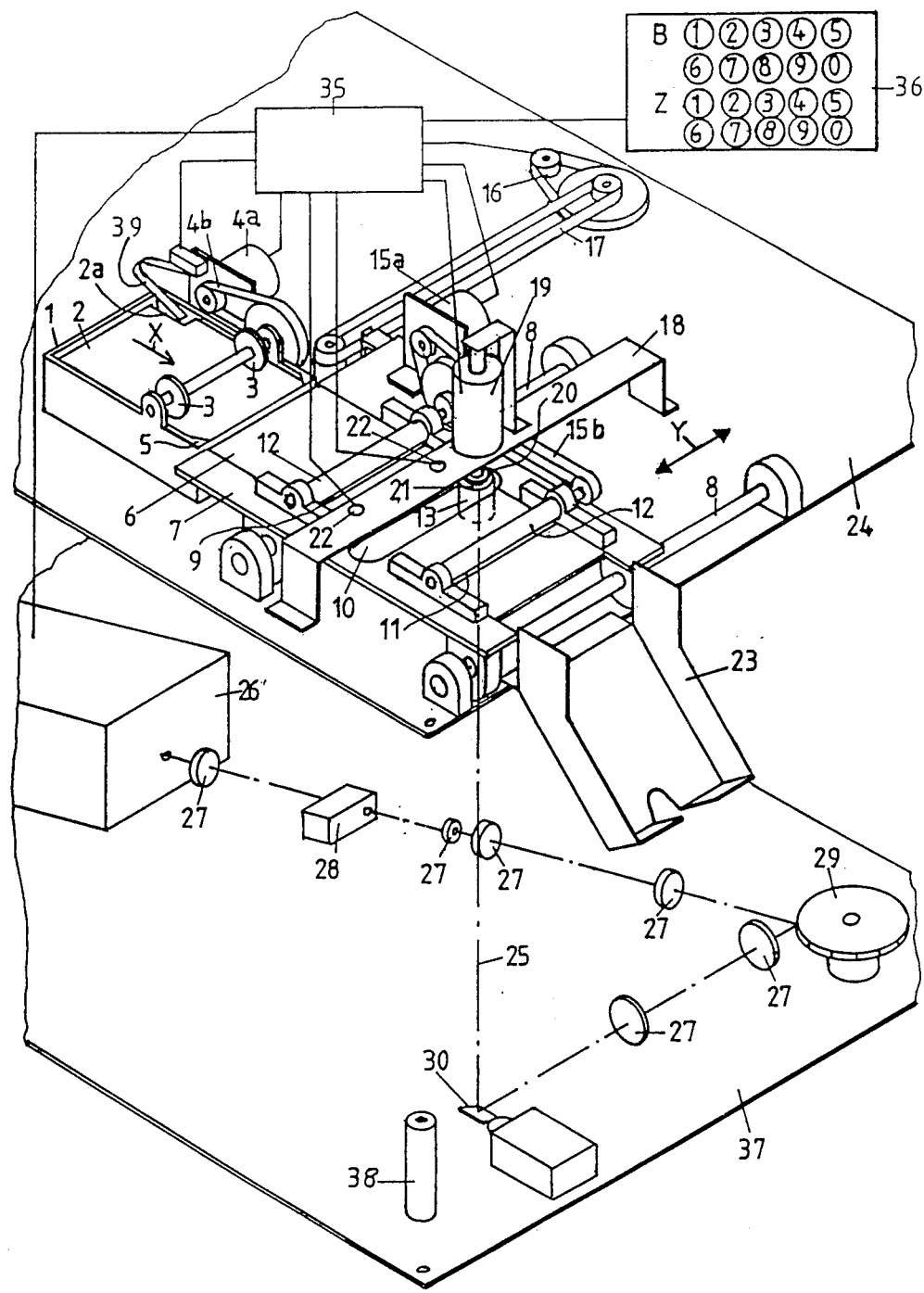

LASER COMPUTER OUTPUT MICROFILM CAMERA

BACKGROUND OF THE INVENTION

The present invention relates to a laser computer output microfilm [COM] camera for the utilization of direct read after write [DRAW] film.

More particularly, it relates to a camera of the above mentioned type provided with a film gate in which film is moved in one direction for example with reciprocation by means of a film transporting device in an image stepped manner and also is moved with reciprocation normally to the movement direction of the film parallel to a film plane also in the image stepped manner, the camera has a film supply device prior to the gate and a catching device for a microfiche ready to use and produced from the film. The computer-controlled laser beam in the region of the image field of a microfiche image is deflected by means of a rotatable polygonal mirror from the beginning of lines to the end of lines and back, and is deflected by means of a swinging mirror in direction of the next line and back. It is projected by means of an objective sharply onto the film gate or onto the film contained in the film gate.

Such a microfiche making camera is disclosed for example in U.S. Pat. No. 4,427,292. In this camera the light-sensitive sheet film is transported from a cassette into a picture taking gate and back into the cassette and finally developed. The sheet film is moved by means of a transported roller pair in steps under or over a projecting objective. A complete original side is reduced into a microimage, so that a row images in the transporting direction is produced. The image gaps arranged normally to the transported direction are obtained by stepped displacement of the complete arrangement normally to the transporting direction. This type of the known microfiche taking camera has the disadvantage that on a produced microfiche no completions or supplements can be performed.

A process is also known with the utilization of a thermally treatable, light-sensitive microfiche material, in accordance with which each individual image is first made light-sensitive by thermal treatment directly prior to the illumination, then illuminated and then developed by thermal post-treatment and fixed. In this process only the image field of a single microimage to be illuminated is sensibilized and subsequently illuminated and developed, and then when needed the next image field is treated in the same manner. Therefore, in accordance with this process it is possible to take a row of microimages of one step, for example document parts on a microfiche, and during further carrying out of the step, for example the documents to provide further associated microimages later on the same fiche. This process involves not only a substantially expensive treatment of each individually produced microimage on a microfiche. Also, the production of completions or supplements on a microimage which is for example not completely used is not possible, since after the sensibilization, illumination and development of a microimage it cannot be made again light-sensitive.

Finally, a laser COM system is known, as disclosed for example in the Journal of Applied Photographic Engineering, Volume 9, Feb. 1983, in which a metal layer arranged on a transparent substrate and coated with a transparent protective layer is used as a role film. The computer-controlled laser beam is directed per each image in point-like manner to lines and gaps on a so-called DRAW material [direct read after write material] and melts the points of 0.1-1 micron in diameter from the metal layer, so that the film becomes transparent on the laser beam-illuminated points. The roll film after the illumination is cut to microfiches if necessary. This system has the advantage that no film development is further needed and that arrangement of the material can be performed with full daylight. However, in this arrangement it is also not possible to bring additional microimages later on an individual illuminated microfiche which is provided not with a maximal number of microimages, for example for microfilming of documents supplied in a time sequence one after the other to be associated with one another. It is not possible with this arrangement to subsequently complete individual microimages. Moreover, in this arrangement there is a disadvantage that both the film gate and the film supply roller must move transversely to the film transporting direction.

SUMMARY OF THE INVENTION

Accordingly, it is an object of the present invention to provide a camera of the above mentioned general type in which the production of microfiches is possible without movement of the film supply transversely to the film transporting direction, on the one hand, and which makes possible the subsequent illumination of individual microimages on a microfiche whose image surface is not completely covered with microimages and which makes also possible subsequent completion of individual already taken microimages.

In keeping with these objects and with others which will become apparent hereinafter, one feature of the present invention, briefly stated in a camera of the above mentioned type in which the supply device is formed as a partially upwardly or downwardly open stack container in which the film is supplied as a microfiche sheet film and transported sheet-by-sheet by transporting rollers or a suction device and a transporting roller pair of a film gate, and the stack container is arranged immovably, while the movement of the film gate and the sheet film in the film gate as well as the return of the film gate after the production of microfiche into a loading position associated with the stack container is controlled by a control device.

Because of the supply of the film as sheet film material in a supply stack container which is stationarily arranged in the cover, the number of parts which are to be moved during the film transportation is reduced. Because of the lowered masses to be moved, a required exact movement of the film relative to the objective is achieved easier. Moreover, an individual illuminated microfiche or a stack of illuminated microfiches can be introduced by hand into the stack container in respective sequence for completing the same in a computer-controller manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a perspective view showing a laser computer output microfilm camera in accordance with the present invention.

DESCRIPTION OF A PREFERRED EMBODIMENT

A laser computer output microfilm camera in accordance with the present invention has a stack container 1 which is formed as a feeder. A stack of films in microfiche format is pressed by a spring-biased raising table 2 inside the stack container 1 against transporting wheels 3. The transporting wheels 3 are moved in the direction of the arrow X by means of a drive 4a, 4b, separate the uppermost film sheet by a corner separator 5 from remaining film pack, and transport the same into a film running path 6 of a film gate which is formed as a carriage 7.

The carriage 7 is supported on bar guides 8 and movable in Y direction by means of a drive 16, 17. The carriage 7 has throughgoing openings 9, 10, 11 for extending therethrough a transporter roller pair 12 and an objective 13. A not-shown film is transported in X direction by means of the roller pair 12. The objective 13 lies between the roller pair 12 whose distance therebetween is smaller than the length of the film sheet as considered in the transporting direction X. The roller pair 12 is driven synchronously from a drive 15a, 15b which is supported on the carriage 7.

A bridge 18 is fixedly mounted over the carriage 7 near the first roller pair 12. It holds a lifting magnet with a pressing plunger 20 which presses the film during the illumination or recording, against a plane surface 21 of the objective 13. The bridge 18 further has light barrier 22 which guarantee an exact positioning of the film relative to the objective 13 and releasing the control of the drive for the film gate 7 and the film.

A catching container 23 for the finished fiches is located behind the feeder 1 and the carriage 7. It is supported on a supporting leg 24 together with other parts for the film transportation.

The drives 4a, 4b and 16, 17 and 15a, 15b are formed as endless belt drives 4b, 17, 15b which are coupled with stepping motors 4a, 16, 15a. Of course, these drives can be formed in a different manner which is known for microfiche gates. The motors 4a, 16, 15a, the magnet 19, the light barriers 22, as well as a known computer-controlled laser beam device which will described hereinbelow, are connected with an electronic control device 35. The control device 35 and/or the computer control for the laser are coupled with a selection device 36.

The sheet film material which is to be supplied in the stable container or feeder 1 has, as mentioned hereinabove, the format of microfiches and is composed of DRAW [Direct Read After Write] material to be recorded in a respective manner by laser beams. In other words, it is a metal layer which is coated at both sides by a transparent coating and melted off at the location at which it is heated by laser beams, so that at these locations the film is transparent. The diameter of the laser beam is so small that through the objective 13 only points with diameter of 0.1–1 micron are projected onto the film.

In the initial position the feeder 1 and the film running path 6 are in alignment with one another and with the catching container 23. A not-illuminated or a partially illuminated microfiche is transported for recording from the feeder 1 by the rollers 3 into the film gate 6, 7 and then engaged and transported further by the first transporting roller pair 12. When the end edge of the microfiche reaches the testing arrangement 22, the stepping drive 15a, 15b and 16, 17 is controlled via the arrangement 35 so that in the event of a not-illuminated microfiche the first image field of the microimage to be produced is associated with the objective 13. After this illumination the film gate 6, 7 is moved in a stepped manner from image field to image field and thereby image-to-image in Y direction. At the end of the first microimage gap produced in this manner, the film is moved by one image step in X direction and then the film gate 6, 7 is again moved in the image-wise manner in Y direction. It is possible with each new image gap to withdraw the film gate first in Y direction and then again to displace in direction of the illumination sequence in Y direction. This is the most favorable way because of the image sequence. Basically it is also possible to arrange the individual microimages in a meandering manner, or to produce first the image row in X direction and then to produce in Y direction the further rows parallel to X direction.

When from one process several sides are premicrofilmed and on the respective microfiche still not illuminated image fields are available, further record pieces of these processes can be prefilmed on the respective microfiche on the free image fields so that the microfiche or several respective microfiches are fed above into the feeder. After the transportation of the respective microfiche into the film gate 6, 7 the image field on the microfiche is selected on a selection arrangement 36 which can be provided in the camera as a special switch board or the keyboard of a computer image screen. This image field is positioned by the drive arrangement 15a, 15b or 16, 17 relative to the objectives 13, on which the microfilming must be further performed. In a known manner a further image screen can be provided with which the microfilm to be described can be tested as to its condition and can be read.

After the end of the illumination of a microfiche, the microfilm gate 6, 7 is directed by means of the control arrangement 35 and the drive arrangement 16, 17 again to the feeder 1 and the catching container 23. The finally illuminated microfiche is then transported by means of the second transporting roller pair 12 into the catching container 23, so that a further microfiche can be supplied from the feeder into the film gate 6, 7. The control of the supply and withdrawal of the microfiche to be illuminated or illuminated is performed advantageously also by the selection arrangement 36 or by computer image screen. During the illumination of the individual microimages the magnetically controlled pressing plunger 20 presses the microimage against the objective 13. During each transportation this plunger 20, controlled by the control arrangement 35, is lifted from the film so as to prevent damaging of the latter.

Recording of the individual microimages is performed by a computer-controlled laser beam 25 which is supplied from a computer-controlled laser unit 26 via an optical system 27, and known acousto-optical modulator 28, a polygonal mirror 29 and a swinging mirror 30 through the objective 13 onto the film. The automatic electronically controlled polygonal mirror 29 controls the movement of the laser beam 25 from the beginning of lines to the end of lines of the microimage, while the swinging mirror 30 leads the laser beam from line to line of the microimage. Because of the utilization of a feeder 1 for sheet films in microfiche format, not only the input and further elimination of partially illuminated microfiche is possible, but also it is possible to provide further recording on an individual selected microimage of a predetermined line via the selection arrangement 36 by the respective adjustment of the swinging mirror 30 and/or the polygonal mirror 29, from which then computer-controlled additional recordings can be brought on the selective microimage. A respective selection arrangement 36 has advantageously two rows of numbers 0 through 9, from which the row of numbers identified with reference B is associated with the image selection and the row of numbers identified by reference Z is selected with the lines selection for a microfiche which is illuminated and to be completed.

For the sake of simplicity the further arrangement in the drawing is thus arranged on a further support plate 37 located under the support plate 24. Both plates 24 and 37 are fixed at a distance from one another by spacing pins 38. In practice, the laser part and in some cases the film gate 6, 7 with the drives is accommodated in a closed housing, while the feeder 1 and the catching container 23 can lie in a freely accessible manner. Instead of the roller drive 3 for receiving the individual film sheets from the feeder, a known suction device can be used. Furthermore, it is possible to provide a sensor 39 which in the event of a sheet film absence in the feeder 1 falls into a recess 2a of the raising table 2 and turns off via the control arrangement 35 the drive 4a, 16, 15a and/or a prior device. Moreover, it is possible in a known manner to use a stack container 1 in which respectively the lowermost film sheet of a stack is withdrawn from the lower side of the stack. Finally, it is also possible to provide in association with the film gate 6 a further arrangement which senses a microfiche supply into the film gate as to not illuminated or free image fields and positions by this free image field onto the objective by the control arrangement 35 and the drive arrangements. It can be favorable when for each microimage during the first illumination a position mark is illuminated, which is associated with a position sensing arrangement connected with the control arrangement 35. By means of such position sensing device a microimage to be completed is controlled in its position available during the first illumination relative to the objective 13, by means of the transporting arrangement 15a, 16. It will be understood that each of the elements described above, or two or more together, may also find a useful application in other types of constructions differing from the types described above.

While the invention has been illustrated and described as embodied in a laser computer output microfilm camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A laser computer output microfilm camera for utilization of direct read after write film, comprising a film gate; means for transporting a film in said film gate in stepped manner in one direction; means for moving said film gate normal to said one direction and parallel to a film plane also in a stepped manner; film supply means for supplying a film into said film gate; means for receiving a ready to use microfiche produced from the film; means for deviating a laser beam in the region of an image field of a microfiche image from the beginning of lines to the end of lines and back, and to a next line and back; a computer which controls the laser beam; objective means for projecting the laser beam onto said film gate or onto a film contained in the latter, said film supply means being formed as a stack container which is at least partially open in which the film as a microfiche sheet film is stored in a stack; withdrawing means for withdrawing the film from said stack container and then transporting as a sheet to said film gate, said stack container being immovable; control means arranged to control the movement of said film gate, the transportation of sheet film in said film gate, the return of said film gate after production of a microfiche to a loading position associated with said stack container, said control means being formed as a single control device; and selecting means formed as a selecting device connected with one of said control means and said computer and formed so as to arrange individual image fields of a microfiche to be transported in said film gate with respect to said objective means so as to provide illumination of the same by the laser beam.

2. A laser computer output microfilm camera as defined in claim 1, wherein said means for deviating the laser beam in the region of the image field of a microfiche image includes a rotatable polygonal mirror for deviating the laser beam from the beginning of lines to the end of lines and back, and a swinging mirror for deviating the laser beam to a next line and back.

3. A laser computer output microfilm camera as defined in claim 1, wherein said means for withdrawing the film by sheets from said stack container includes transporting rollers.

4. A laser computer output microfilm camera as defined in claim 1, wherein said means for withdrawing the film by sheets from said stack container includes a suction device.

5. A laser computer output microfilm camera as defined in claim 1, wherein said means for receiving a microfiche formed as a catching basket which is arranged stationarily in an extension of said stack container behind said film gate.

6. A camera as defined in claim 1, wherein said stack container has a bottom formed as a raising table for automatic lifting of an uppermost sheet from the stack onto a transporting plane of said means for transporting a film in said one direction.

7. A camera as defined in claim 6, wherein said means for transporting a film in said one direction includes a transporting roller pair which forms said transporting plane onto which an uppermost sheet stack is lifted by said raising table.

8. A camera as defined in claim 6; and further comprising means for sensing an absence of sheet film and turning off said means for transporting the film in response to said sensing.

9. A camera as defined in claim 8, wherein said sensing means is arranged so as to turn off the camera in response to said sensing.

10. A camera as defined in claim 6, wherein said raising table has an opening, said sensing means including a sensor arranged in said opening and actuating said control means for turning off at least said means for transporting a film.

11. A camera as defined in claim 1, wherein said transporting means includes two transporting roller pairs arranged inside of said film gate and spaced by a distance which is smaller than a length of a sheet film as considered in a transporting direction.

12. A camera as defined in claim 11; and further comprising sensing means arranged between said transporting roller pairs closer to a first of said transporting roller pairs as considered in a transporting direction and at a predetermined distance from said objective means and connected with said control means for sensing a film sheet introduced into said film gate, said sensing means being operative for counting each steps but through said control means in said one transporting direction of transporting of a film and in said normal direction of moving said film gate.

13. A camera as defined in claim 1, wherein said selecting means is formed so as to arrange a not-illuminated image field of a microfiche to be transported to said film gate with respect to said objective and therefore to provide further illumination of the same by the laser beam.

14. A camera as defined in claim 1, wherein said selecting device is formed as a keyboard.

15. A camera as defined in claim 1, wherein said means for deviating the laser beam in the region of the image field of a microfiche image includes a rotatable polygonal mirror for deviating the laser beam from the beginning of lines to the end of lines and back, and a swinging mirror for deviating the laser beam to a next line and back, said selecting means being formed so that said polygonal mirror and said swinging mirror can arrange individual image field associated with said objective, with a microfiche located in said film gate.

16. A camera as defined in claim 15; and further comprising position sensing means connected with said control means and associatable with a position mark which is illuminated in each microimage so as to control a microimage to be completed in its position relative to said objective available during the first illumination.

17. A camera as defined in claim 16, wherein said position sensing means being arranged to cooperate with said means for moving said film gate so as to control a microfilm to be completed relative to said objective in its position available during the first illumination.

18. A laser computer output microfilm camera for utilization of direct read after write film, comprising a film gate; means for transporting a film in said film gate in stepped manner in one direction; means for moving said film gate normal to said one direction and parallel to a film plane also in a stepped manner; film supply means for supplying a film into said film gate; means for receiving a ready to use microfiche produced from the film; means for deviating a laser beam in the region of an image field of a microfiche image from the beginning of lines to the end of lines and back, and to a next line and back; objective means for projecting the laser beam onto said film gate or onto a film contained in the latter, said film supply means being formed as a stack container which is at least partially open in which the film as a microfiche sheet film is stored in a stack; withdrawing means for withdrawing the film from said stack container and then transporting as a sheet to said film gate, said stack container being immovable; control means arranged to control the movement of said film gate, the transportation of sheet film in said film gate, the return of said film gate after production of a microfiche to a loading position associated with said stack container, said control means being formed as a single control device; and sensing means arranged in the region of said film gate and connected with said control means, said sensing means being formed so that a next not illuminated image field of a partially illuminated microfiche arranged in said film gate is recognizable, said control means being formed so that it drives said means for transporting a film in such a manner that a not illuminated image field is movable to the region of said objective means.

* * * * *